United States Patent [19]

Belliere

[11] 4,134,329

[45] Jan. 16, 1979

[54] CONTROL DEVICES HAVING PIVOTAL OUTPUT ELEMENTS DRIVEN BY MEANS OF JACKS

[75] Inventor: Pierre Belliere, Figeac, France

[73] Assignee: Ratier Figeac, Figeac, France

[21] Appl. No.: 771,089

[22] Filed: Feb. 23, 1977

[30] Foreign Application Priority Data

Mar. 9, 1976 [FR] France .................... 76 06636

[51] Int. Cl.² ................................ F01B 3/00
[52] U.S. Cl. ........................... 92/70; 92/108; 92/150; 92/165 R
[58] Field of Search .............. 92/50, 69, 75, 70, 71, 92/31, 108, 150, 151, 165 R, 110, 113, 136; 244/78

[56] References Cited

U.S. PATENT DOCUMENTS

| | | | |
|---|---|---|---|
| 2,144,196 | 1/1939 | Nardone | 92/31 |
| 2,886,005 | 5/1959 | Bryan | 92/75 |
| 2,970,574 | 2/1961 | Geyer | 92/75 |
| 3,056,386 | 10/1962 | Aarvold | 92/108 |
| 3,596,561 | 8/1971 | Keller | 92/108 |
| 3,877,349 | 4/1975 | Schindel | 92/108 |

Primary Examiner—Martin P. Schwadron
Assistant Examiner—Abraham Hershkovitz
Attorney, Agent, or Firm—Holman & Stern

[57] ABSTRACT

A device for controlling two output elements pivotally mounted with respect to two stationary elements is provided with two coaxial rectilinear double action pressure fluid jacks. The two stationary elements are respectively secured to the ends of a stationary outer longitudinal elongated member while the two pivoting elements are respectively secured to the ends of pivotal inner longitudinal elongated member coaxially arranged in said outer member. The jacks are of annular configuration and formed between the outer and inner aforesaid members with a common median bottom and annularly slotted cylinder-heads remote from each other. The tubular piston rod of each jack extends in leak-tight manner through the annularly slotted cylinder-head and is angularly positioned on the one hand, with respect to the corresponding stationary element by a first set of guides and on the other hand with respect to the corresponding pivoting element by a second set of guides forming an angle relative to the first set of guides. The device is particularly suitable for the control of aircraft flaps.

1 Claim, 6 Drawing Figures

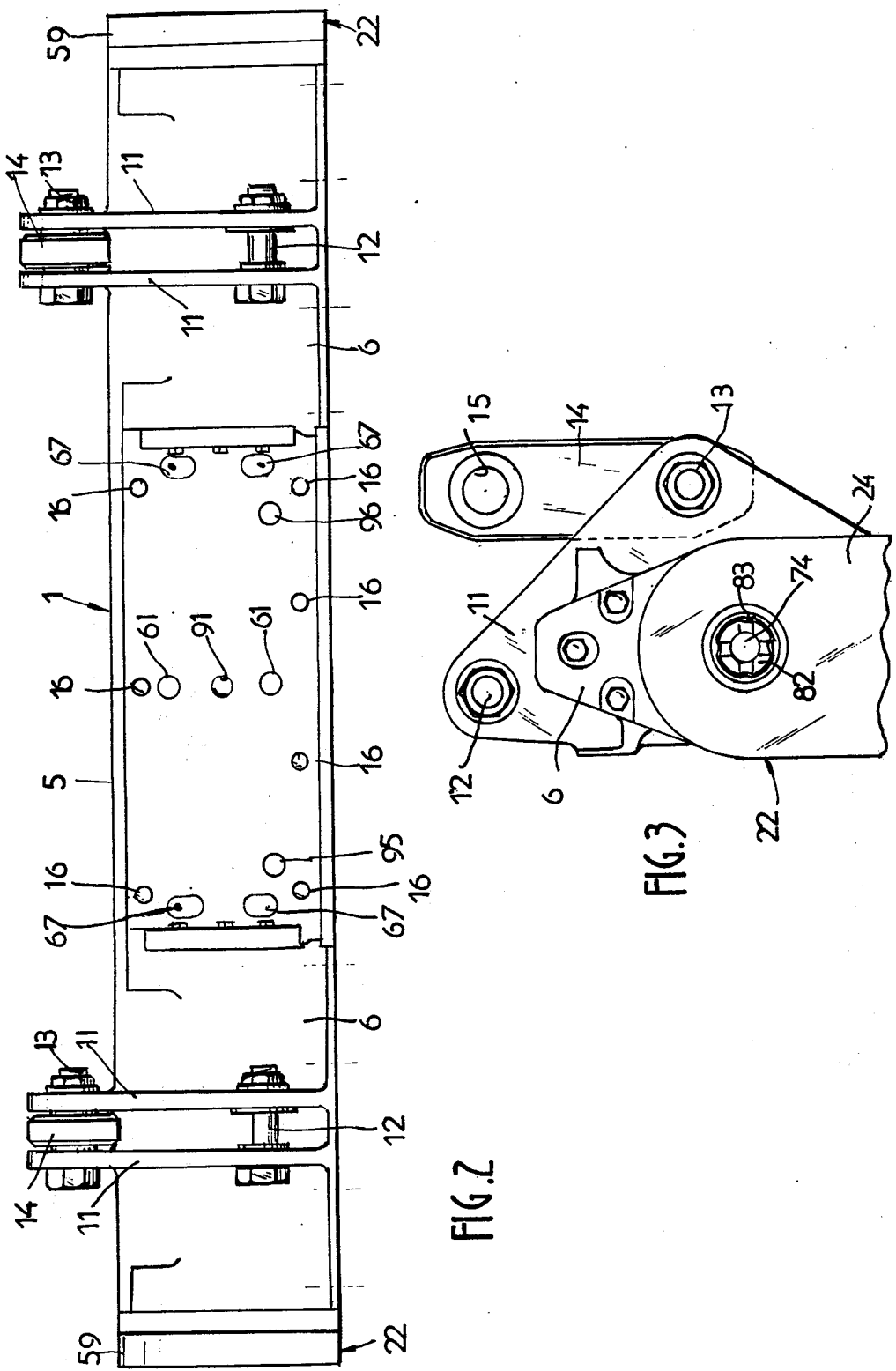

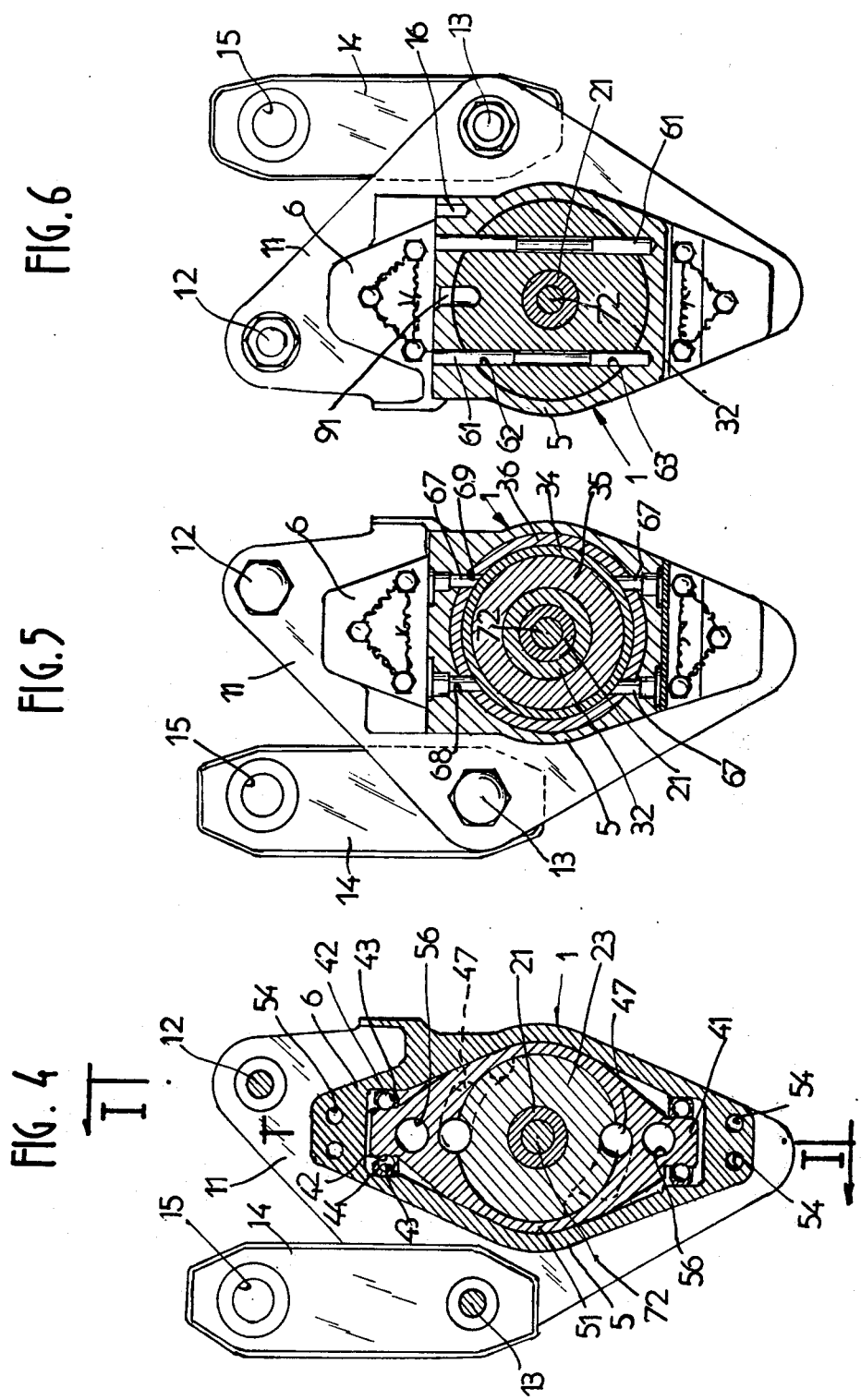

CONTROL DEVICES HAVING PIVOTAL OUTPUT ELEMENTS DRIVEN BY MEANS OF JACKS

This invention relates to control devices having two coaxial output elements which are driven in simultaneous pivotal motion with respect to two stationary elements by means of two oppositely-acting coaxial and rectilinear jacks, these devices being primarily intended to be employed for the control of aircraft flaps.

Devices of this type are already known in which the receiving element of each of the two jacks is associated angularly on the one hand with the corresponding stationary element by means of a first set of guides and on the other hand with the corresponding pivotal element by means of a second set of guides which are inclined at an angle with respect to the guides of the first set.

In a device of this type, the stationary elements and the pivotal elements are placed one after the other in alternate sequence and positioned in the axial direction with respect to each other by means of transverse bearing surfaces whilst the receiving elements of the two jacks are located within the interior of said stationary and pivotal elements. As a result of this general arrangement, the resistance afforded by the pivotal elements produces axial reactions which must be absorbed by the transverse bearing surfaces aforesaid, thus clearly giving rise to impaired efficiency of the control device. Further objections to this device are that it lacks rigidity, that it is of relatively complex design and that it is costly to manufacture.

The aim of the invention is to produce a control device of this type which is not subject to the drawbacks of the known device as recalled in the foregoing.

To this end, in the device in accordance with the invention, the two stationary elements are rigidly fixed to the two ends of a stationary longitudinal member and the two pivotal elements are rigidly fixed to the two ends of a pivotal longitudinal member, the pivotal longitudinal member and the stationary longitudinal member being mounted in coaxial relation one inside the other and each adapted to extend to the full length of the device whilst the receiving elements of the two jacks are placed between said stationary longitudinal member and said pivotal longitudinal member.

By virtue of this particular design concept, the opposite axial reactions produced by the two pivotal members cancel each other and remain as internal forces developed within one and the same member, namely the longitudinal member to which the two pivotal elements are rigidly fixed, with the result that the assembly consisting of the pivotal members is not subjected to any axial stress with respect to the stationary members as a whole. Said assembly can on the contrary be considered as being freely mounted in the axial direction and can therefore be positioned axially without entailing any need for the application of efforts, that is to say without entailing any loss of efficiency. A design solution of this type results in a very rigid assembly having a simple structure.

A more complete understanding of the invention will be gained from the following description and from the accompanying drawings in which one embodiment of a control device in accordance with the invention is shown by way of example, and in which:

FIG. 2 is a plan view corresponding to FIG. 1;

FIG. 3 is a profile view looking in the direction of the arrow III of FIG. 1;

FIGS. 4, 5 and 6 are transverse sectional views taken respectively along lines IV—IV, V—V and VI—VI of FIG. 1.

Figure 1:
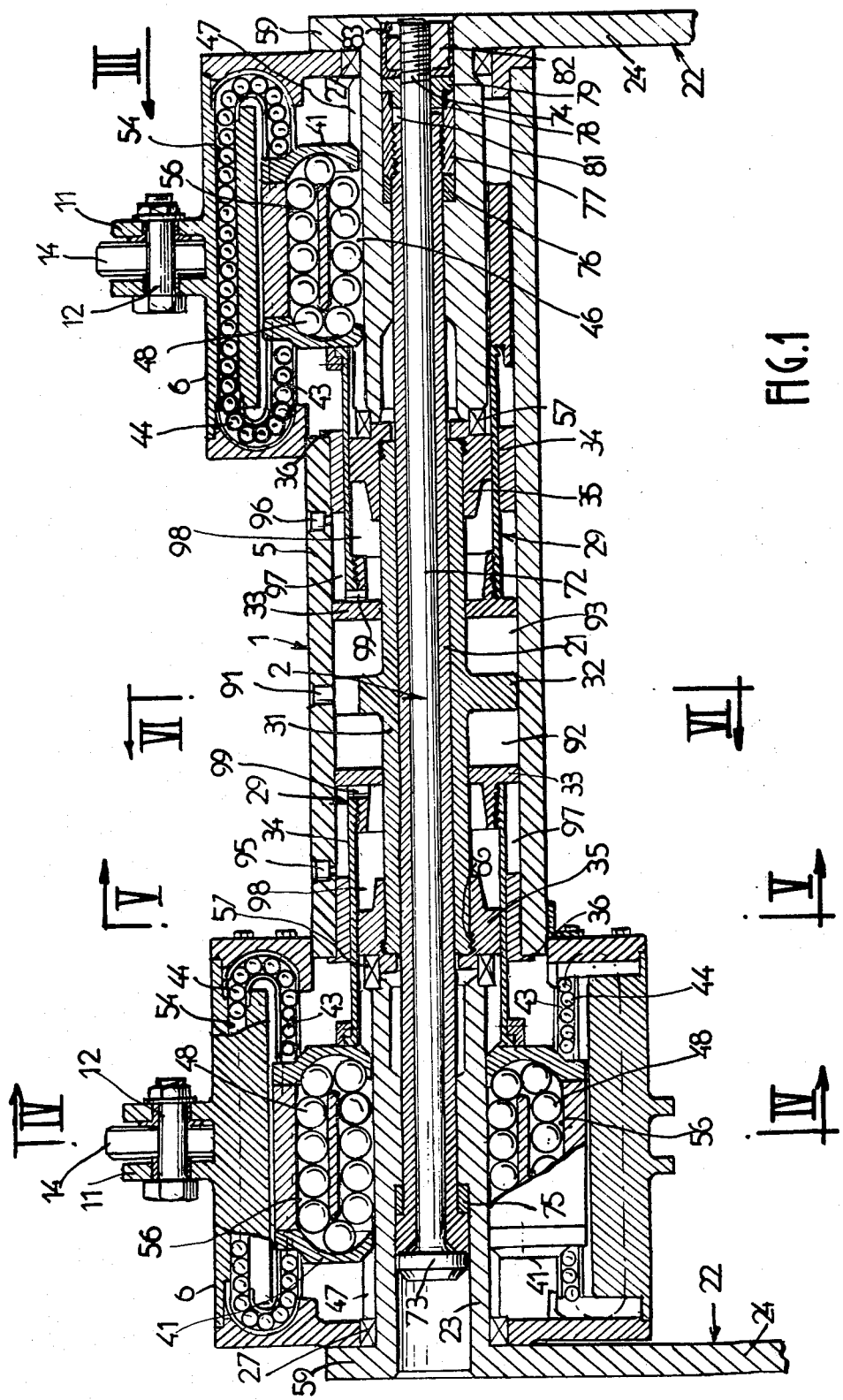
FIG. 1 is a sectional view of the device as a whole, this view being taken substantially along line IG—IG of FIG. 4 in the left half of the drawing and substantially along line ID—ID in the right half of the drawing.

The device for controlling an aircraft flap as generally illustrated in FIGS. 1 to 3 is essentially constituted by a stationary unit 1 of tubular shape within which is coaxially mounted a pivotal unit 2. The device is practically symmetrical with respect to a transverse midplane which passes through line VI—VI of FIG. 1.

The stationary unit 1 is composed of a tubular body 5, two stationary elements 6 being fixed respectively in the two ends of said tubular body. Each stationary element aforesaid is intended to be rigidly fixed to the wing structure of the aircraft and is accordingly provided with a yoke 11, the arms of which are traversed by two pivot-pins 12, 13. The pin 13 carries one end of a link-arm 14 whilst the other end of this latter is provided with a bore 15 for receiving a pin mounted in a corresponding yoke (not shown in the drawings) which is rigidly fixed to the wing structure of the aircraft. The tubular body 5 is further provided with internally-threaded fixing wholes 16 (as also shown in FIG. 6).

The pivotal unit 2 comprises a pivotal longitudinal member 21, two pivotal elements 22 being fixed respectively on the two ends of said member. Each pivotal element 22 is composed of a hub 23 fixed on the corresponding end of the pivotal longitudinal member 21 and of an arm 24 for receiving a corresponding portion of a flap of the aircraft. Each of the two hubs 23 is centered in the corresponding stationary element 6 by means of a roller-bearing 27.

The pivotal movements of the unit 2 are carried out by means of two oppositely-acting coaxial and rectilinear hydraulic jacks 29 having annular cylinders. The external wall of said cylinders is constituted by the stationary tubular body 5 itself and the internal wall is constituted by a tubular member 31, the common cylinder-head of the two jacks being indicated at 32. The piston 33 of each jack is of corresponding annular shape and rigidly fixed to a tubular piston rod 34 which is slidably mounted in leak-tight manner within an annular gap left between two members 35, 36 which form together the corresponding outer cylinder-head of each jack.

The receiving element of each of the two jacks is constituted by an assembly of two carriages 41 which are each angularly associated on the one hand with the corresponding stationary element 6 by means of a first set of double guides 42, 43 (as also shown in FIG. 4) packed with balls 44 and on the other hand with the hub 23 of the corresponding pivotal element 22 by means of a second set of single guides 46, 47 which are packed with balls 48. The directions of the guides of the second set make an angle with respect to the directions of the guides of the first set. In more exact terms, each piston rod 34 is therefore rigidly fixed to two diametrically opposite carriages 41 essentially formed by two end extensions or tongues located in a diametrical plane on a tubular slide-block 51 (as shown in FIG. 4) which is housed between the bore of the stationary tubular body 5 and the external cylindrical surface of the hub 23. The guides of the first set 42, 43 are therefore rectilinear guides whilst the guides 46, 47 of the second set are guides of helical configuration, with the result that a longitudinal movement of translation of the slide-blocks 51 which are rigidly fixed to the piston rods of the two jacks produces a pivotal movement of the hubs 23 of the two pivotal elements 22 either in one direction or the other according to the direction of displacement of the slide-blocks.

Each set of guides 42, 43 comprises a recirculating system 54 for the balls 44, said system being housed within the corresponding stationary element 6 and located in a geometrical plane adjacent to a plane which is parallel to the geometrical longitudinal mid-plane which is common to the two end extensions 41 of the slide-block. Similarly, each set of guides 46, 47 comprises a recirculating system 56 for the balls 48, said system being housed within the corresponding carriage 41 opposite to each row of balls of the guides in the plane of the two end extensions 41 of the slide-block.

Although the entire device is always balanced in the axial direction by reason of its symmetry with respect to the transverse mid-plane VI—VI and consequently by reason of the fact that the helical guides are of opposite pitch at the two ends of the device, it is advisable to ensure that the pivotal unit is positioned axially with respect to the stationary unit. To this end, a roller thrust bearing 57 (shown in FIG. 1) is interposed between the inner end of each of the two pivotal hubs 23 and the external face of the corresponding cylinder-head 35. For safety reasons, each pivotal arm 24 is provided with an annular end-plate 59 which is capable of bearing against the external end face of the corresponding stationary element 6.

FIG. 6 shows how the common cylinder-head 32 is rigidly fixed to the tubular body 5 by means of two rods 61 inserted in bores 62, 63 formed in the tubular body and in the cylinder-head in a direction at right angles to the longitudinal axis of the device as a whole.

The inner portion 35 (shown in FIGS. 1 and 5) of each cylinder-head is fixed on the corresponding end of the internal wall of the cylinder 31 by means of a screw-thread 66 whilst the outer annular portion 36 of the same cylinder-head is rigidly fixed to the tubular body 5 by means of four pins 67 engaged in holes 68 and 69 which are formed respectively in the tubular body 5 and in the annular member 36 in directions at right angles to the longitudinal axis of the complete assembly.

The two pivotal hubs 23 (shown in FIG. 1) are urged towards each other against their respective roller thrust bearings 57 by means of a tensioning system which comprises a central tie-rod 72, one end of which is provided with a head 73 whilst the other end terminates in a threaded portion 74, a spacer ring 75 interposed between annular shoulders of the longitudinal member 21 and of one of the pivotal hubs 23, another spacer ring 76 which is applied against an annular shoulder of the other pivotal hub 23, an internally-threaded sleeve 77 mounted on the corresponding threaded end of the longitudinal member 21 and provided with internal longitudinal splines 78, a sleeve 79 provided with corresponding splines engaged in the splines 78 and an end lug 81 engaged in a corresponding slot formed in the end of the longitudinal member 21 in order to lock the threaded sleeve 77 in rotation, and finally a nut 82 engaged on the threaded end 74 of the central tie-rod 72 and fitted with a locking-washer 83.

The two hydraulic jacks are of the double-acting type and provided with a common central bore 91 which is formed in the tubular body 5 and opens into the two chambers 92, 93 of the cylinders of the two jacks and also with two end orifices 95, 96 which have their openings respectively in the opposite ends of the two cylinders. The annular gaps formed in each jack between the tubular piston rod 34 and on the one hand the external wall of the cylinder formed by the tubular body 5 and on the other hand the internal wall 31 of the cylinder or in other words the two chambers 97, 98, are put into communication by means of radial bores 99 formed in the piston rod 34 close to the piston 33.

The operation of the device is as follows: if the liquid under pressure is admitted for example through the common central bore 91, the two pistons 33 are urged away from each other and are accompanied by the carriages 41 which are guided by the ball races 42, 43 of the first set and therefore slide within the stationary unit 1 without pivoting with respect to this latter. By means of the races or guides 46, 47 of the second set, however, said carriages cause the inner unit 2 to pivot through an angle which corresponds to the length of travel of the carriages. During this movement, the liquid contained in the chambers of the jacks such as the chambers 97, 98 returns to the collector-tank through the end orifices 95, 96.

If the liquid under pressure were admitted through the two end orifices 95, 96 while the common central bore 91 was connected to the collector-tank, the pistons would on the contrary move towards each other accompanied by the carriages 41 which would then produce a pivotal movement of the inner unit 2 in the opposite direction.

It will be noted that, under the action of the helical guides 46, 47, the axial reactions produced by the two pivotal units 22 cancel each other since they are oppositely-directed internal forces which are developed within the inner unit, said unit being maintained in tension by the central tie-rod 72 and capable of affording resistance both to extension and to compression according to the direction of pivotal motion, with the result that no harmful axial pressure is produced between the stationary elements and the pivotal elements.

As will readily be apparent, the invention is not limited to the embodiment hereinabove described with reference to the accompanying drawings. Depending on the applications which are contemplated, many modifications can accordingly be made without thereby departing either from the scope or the spirit of the invention.

What is claimed is:

1. A pressure fluid actuated control device comprising:
   a stationary outer longitudinal elongated tubular member;
   a pivotal inner longitudinal elongated member coaxially arranged for pivotal movement in said stationary outer longitudinal elongated member;
   two stationary elements respectively secured to the ends of said stationary outer longitudinal elongated tubular member;
   two pivotal elements respectively secured to the ends of said pivotal inner longitudinal elongated member;
   two longitudinal annular double acting pressure fluid jacks formed end to end between said stationary outer longitudinal elongated tubular member and said pivotal inner longitudinal elongated member, said jacks having a common median bottom located mid-way in said stationary outer longitudinal elongated tubular member, annularly slotted cylinder-heads remote from each other, annular pistons and tubular piston rods slidably engaged in leak-tight manner through said annularly slotted cylinder-heads, radial bores being provided through each said tubular piston rod adjacent said piston;

pressure fluid entrance and exit ports through said stationary outer longitudinal elongated tubular member for controlling said jacks;

a first set of cooperating guides operatively connecting each said piston rod and the corresponding said stationary elements for angularly positioning said piston rod relative to said stationary element;

a second set of cooperating guides operatively connecting each said piston rod and the corresponding said pivotal element for angularly positioning said piston rod relative to said pivotal element; said second set of cooperating guides forming an angle relative to said first set of cooperating guides; and a tubular slide block slidably mounted around each said pivotal element and secured to the corresponding said tubular piston rod, said tubular slide block having two diametrically opposed longitudinal tongues arranged in a common longitudinal middle plane and having two lateral guides, each said stationary element having an inner longitudinal complementary guide facing each of said lateral guides of said tongues, said second set of cooperating guides comprising two longitudinal rows of balls diametrically arranged between said pivotal element and said tubular slide block and a ball recycling circuit in said tubular slide block facing each said two longitudinal rows of balls, said first set of cooperating guides comprising on each side of each said recycling circuits a further longitudinal row of balls interposed between each said lateral guide of each said tongue and the corresponding complementary inner guide of the corresponding said stationary element and a further ball recycling circuit associated with each of said further four rows of balls and arranged in said stationary element in a plane near a plane parallel with said common longitudinal plane of said two tongues.

* * * * *